United States Patent Office.

EBEN NORTON HORSFORD, OF CAMBRIDGE, MASSACHUSETTS.

Letters Patent No. 104,311, dated June 14, 1870.

IMPROVEMENT IN THE MANUFACTURE OF BEVERAGES FOR MEDICINAL AND OTHER PURPOSES.

The Schedule referred to in these Letters Patent and making part of the same.

*To whom it may concern:*

Be it known that I, EBEN NORTON HORSFORD, of Cambridge, in the county of Middlesex and State of Massachusetts, have invented a certain new and useful Improvement in the Preparation of Liquid Acid Phosphates for Beverages, of which the following is a specification.

The liquid acid phosphates to which my invention relates are substantially such as described in Letters Patent No. 75,272, granted to me on the 10th March, 1868, and my object is to prepare this liquid for use as a medicinal beverage or a refreshing drink.

To prepare the liquid for the uses stated, I mix the same with water in the proportion of a teaspoonful, more or less, to an ordinary-sized tumbler of water, and I then charge the same with carbonic-acid or nitrous-oxide gas, or other gas or mixture of gases, in the ordinary soda fountain or bottles closed by means of corks or siphon stoppers, or in any other suitable closed vessel or apparatus. It may be mixed with sugar, sirup, or other flavoring essences or liquids according to the taste of the user or the purpose for which it is to be employed.

What I claim as my invention, and desire to secure by Letters Patent, is—

The preparation of medicinal beverages or refreshing drinks, composed of the liquid acid phosphate diluted with water in the proportions as set forth, combined, or not, with other flavoring substances, and charged with carbonic-acid or nitrous-oxide gas or other gas or mixture of gases in bottles or other closed vessels or apparatus.

In testimony whereof I have signed my name to this specification before two subscribing witnesses.

E. N. HORSFORD.

Witnesses:
WILLIAM HEDGE,
WINSLOW WARREN, Jr.